2,953,466
SILICON-MICA COMPOSITION

Sanford W. Brown, Norwalk, Calif., assignor to North American Aviation, Inc.

No Drawing. Filed Aug. 9, 1956, Ser. No. 603,189

20 Claims. (Cl. 106—39)

This invention relates to a silicon-mica composition of matter. More particularly, this invention relates to mica particles bonded together with silicon.

Mica is known for its insulation quality and is widely used in the preparation of insulation material in sheet form. A problem presents itself in obtaining a suitable binder for mica particles in the manufacture of high temperature resistant mica compositions. One suggestion in the art has been the use of a binder composed of a mixture of ethyl silicate and one or more resins of the vinyl acetate type. The binding material is treated in the presence of water or an alcohol so as to hydrolyze the ethyl silicate to silicic acid. The resulting mixture of the resin and the silicic acid served as a binding material for the mica flakes. The shortcoming of this material is that it will not withstand elevated temperatures at which carbon-containing compounds decompose. When the resin decomposes, the mica sheet disintegrates. The silicic acid has no binding properties at elevated temperatures since it apparently decomposes giving off water and forming $SiO_2$ without the formation of bonds with the mica. Therefore, a need exists for a mica composition of matter which can withstand temperatures in excess of 1000° C.

It is therefore an object of the present invention to provide a novel silicon-mica composition of matter. It is likewise an object of this invention to provide a silicon-bonded mica insulating material. Another object of this invention is to provide an inorganic filler-impregnated silicon-mica composition of matter. It is likewise an object of this invention to provide a silicon-mica-filler composition of matter. It is also an object of this invention to provide a silicon-mica composition of matter which does not decompose at elevated temperatures. It is likewise an object of this invention to provide a high temperature electrically insulating mica-containing composition. A further object of this invention is to provide methods of preparing high temperature electrically insulating silicon-mica compositions of matter.

The above and other objects of this invention are obtained by a novel silicon-mica composition of matter. This composition consists of mica bonded together with silicon. The silicon-mica product which may be called silicon-bonded mica, or silicon-impregnated mica, withstands temperatures in excess of 1000° C. without evidence of decomposition.

It is not intended that the scope of this invention be limited or restricted to any particular manner or type of bond between the silicon and the mica since the exact nature of the bond is not known. However, it is believed that the silicon is bonded directly to the mica by silicon-mica bonds. These bonds may be formed by the silicon with any of the elements of which mica is composed such as the aluminum, silicon and oxygen atoms, etc.

The amount of silicon in the silicon-mica composition can vary from 0.1 to about 100 weight percent based on the mica. When manufacturing a mica sheet of about 0.001 inch in thickness from particles having a diameter of from 10 microns to about 1 centimeter, 0.1 percent silicon properly bonded therewith is sufficient to impart a perceptible degree of increased cohesiveness to the particles in the sheet. When a compatible filler is used in admixture with the mica, as for example 100 weight percent, based on the mica, of aluminum silicate, the mica and filler may be bonded together with as high as 100 weight percent silicon. Greater amounts of silicon may also be used but no additional advantage is imparted to the mica composition by the use of excess silicon. The preferred amount of silicon in the silicon-mica composition is from 1 to about 25 weight percent based on the mica. This amount of silicon provides silicon-mica compositions with sufficient cohesive and tear resistant properties to make it suitable for a variety of uses including electrical insulation. An especially preferred amount of silicon in the composition is from 10 to about 20 weight percent based on the mica as when this amount is used in the manufacture of insulation material having a thickness of about 0.001 inch products having optimum insulating and physical properties are obtained.

The silicon-mica composition of matter of this invention is obtained by reacting mica with a silicon-containing compound at a temperature high enough to bring about reaction and bonding of the mica together by silicon-containing bonds. In order to effectively bond the mica particles together, the silicon atom or silicon-containing group which is introduced should be capable of forming two bonds with the mica and also the filler if the latter is present. In that way two different particles can be bonded together. Therefore, the silicon-containing compound used for bonding should have at least two substituents on each molecule which will be liberated on heating, thus making available two bonds on the silicon-containing molecule for bonding with mica and filler. Therefore, an embodiment of this invention is a process of manufacturing silicon-mica compositions by reacting mica with silicon-containing compounds wherein each silicon-containing molecule has at least two — Y groups attached to a silicon atom or atoms, wherein —Y is selected from the group consisting of —X, —$NR_1R_2$, —$OR_3$,

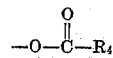

wherein —X is a halogen atom, $R_1$ and $R_2$ can be hydrogen or hydrocarbon groups having from 1 to about 18 carbon atoms, and $R_3$ and $R_4$ are hydrocarbon groups having from 1 to about 18 carbon atoms. Thus, the silicon-containing compounds which can be used for binding mica have the general formula $MY_nZ_{(2m+4-n)}$ wherein Z may be a hydrogen, a hydrocarbon group having from 1 to about 18 carbon atoms, or ½ O wherein O represents oxygen. When Z represents ½ O, then there are at least two such Z's on one silicon atom which then together represent an oxygen atom attached to the silicon by a double bond as for example in diethyl meta silicate. Y is as defined above and $m$ is defined hereinbelow. M is the silicon-containing part of the compound selected from the class consisting of

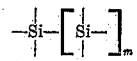

and

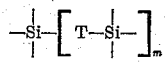

wherein T may be oxygen, $NR_1$, and $CR_1R_2$, wherein the R's can be hydrogens or hydrocarbon groups having from 1 to about 18 carbon atoms and wherein $m$ can be zero or an integer selected from 1, 2, 3, 4, etc. The symbol $n$ is an integer having a value of from 2 to $(2m+4)$. For example, when $m$ is zero the value of $n$ can vary from 2 to 4 while when $m$ is 1 the value of $n$ can vary from 2 to 6.

When in the formula $MY_nZ_{(2m+4-n)}$ $m$ is equal to zero, the silicon compound is a silane which can also be represented by the formula

wherein the Y's are as defined hereinabove and J can be either Y or Z which are also defined above. When Y is a halogen and J is a hydrogen or a hydrocarbon group, the compound is a halosilane, examples of which are silicon tetrachloride or tetra chloro silane, trichloro hydrogen silane, methyl trichloro silane, dimethyl dibromo silane, methyl dichloro hydrogen silane, diethyl difluoro silane, butyl trichloro silane, etc.

When Y represents OR the compound is a silane which is also classified as an organic silicate. There are two types of silicates or silicon esters, namely, the ortho silicates having the general formula

$$Si(OR)_4$$

and the meta silicates having the general formula $(R''O)_2SiO$ wherein the R''s and R'''s can be the same or one or more of the R''s and R'''s can be different from the others, and are hydrocarbon groups having from 1 to about 18 carbon atoms. The above formula for meta silicates corresponds to the formula

in which the J's each represent one-half an oxygen atom, the $J_1$ and $J_2$ being combined to form 1 oxygen atom which is attached to the silicon by a double bond. Nonlimiting examples or ortho silicates are tetra methyl ortho silicate, tetra ethyl ortho silicate, tetra butyl ortho silicate, tetra dodecyl ortho silicate, tetra octadecyl ortho silicate, dimethyl diethyl ortho silicate, dimethyl diphenyl ortho silicate, tetra furfuryl ortho silicate, ethyl trifurfuryl ortho silicate, dimethyl ditolyl ortho silicate, etc. Nonlimiting examples of the meta silicates are diethyl meta silicate, methyl ethyl meta silicate, dipropyl meta silicate, dioctyl meta silicate, diphenyl meta silicate, dioctadecyl meta silicate, difurfuryl meta silicate, etc.

The use of the ortho and meta silicates is preferred in the process of preparing the silicon-mica compositions of this invention because of ease of carrying out the reaction. Especially preferred are the ortho silicates which provide the maximum number of potential bonds for cross-linking and, therefore, for cross-binding of mica as well as filler particles. Of the ortho silicates the tetra ethyl ortho silicate is found to give exceptionally good results and its use is a preferred embodiment in the process.

When Y in the silane formula given above represents compounds having the general formula

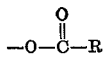

the compounds include silicon tetra acetate, silicon tetra butyrate, silicon tetra benzoate, etc. When Y represents OR'''(OH)$_r$ group, in which R''' is the hydrocarbon portion of the molecule and $r$ is an integer selected from the series 1, 2, 3, etc., the compounds can be tetra glycol ortho silicate, tetra-2(1,3-dihydroxy propenyl)ortho silicate, di-2(1,3-dihydroxy propenyl)-di-butyl ortho silane, etc.

When Y represents $NR_1R_2$ in which the R's can be hydrogens or hydrocarbon groups having 1 to 18 carbon atoms, the compounds can be tetra amino silane, tetramethylamino)silane, tetra(diethylamino)silane, tetra(ethylamino)silane, di(ethylamino)-di(phenylamino)silane, etc.

Mixtures of various groups can also be present on the same silicon atom or compound as, for example, in compounds such as dimethyl diethoxy silane, diphenyl dimethoxy silane, diethoxy silicon diacetate, dichloro diethoxy silane, dibromo dimethoxy silane, difluoro difurfuryloxy silane, dioctadecyl diethoxy silane, di(diethylamino)diethoxy silane, diphenyl di(dodecylamino)silane, dimethyl silicon diacetate, ethylamino ethoxy silicon oxide, dimethylamino phenoxy silicon oxide, furfuryloxy chloro silicon oxide, dibromo di(diphenylamino)silane, dihydrogen diethoxy silane, etc.

Compounds such as

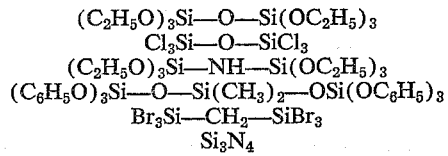

can also be used.

The preparation of all the above silicon compounds may be found in the text "Silicones and Their Uses," by Rob Roy McGregor, first edition, McGraw Hill Book Company, Inc., New York.

Of all the possible silicon compounds that can be employed to form the silicon-mica composition of this invention, it is preferred to use compounds containing a single silicon atom per molecule as in the case of silanes which includes the amino-substituted silanes, the halo-substituted silanes and the silicates, since these compounds react at elevated temperatures in a manner which provides maximum bonding between the particles of mica, and also of mica and filler when the latter is present.

The mica used in the preparation of the novel silicon-mica composition of this invention can be mica flakes having a particle size of from about 10 microns to about 1 centimeter in diameter and even higher. The size of the mica particle is not critical. Other forms of mica that can be used are powdered mica, and mica which has been converted into pulp and ordinarily used in the manufacture of mica sheets by conventional paper making methods. Shredded mica may also be employed in the manufacture of the composition of this invention. In other words, mica in any physical or chemical form is suitable for the instant process. Hence, the word mica in this invention includes black mica or biotite, lithium mica, white mica or muscovite, magnesium mica, synthetic mica and mixtures of these. The synthetic mica is produced by a process described in Electrical Manufacturing, vol. 45, No. 3, pages 99–103 (May 1950), in an article entitled "Progess in Synthetic Mica."

The mica is reacted with the silicon compound of the kind described above at elevated temperatures. These temperatures range from 60° C. to about 1500° C. In carrying out the process the temperatures should be high enough to expel or cause the evaporation of the hydrocarbon-containing portion which is given off in the reaction. For example, when mica is reacted with tetraethyl ortho silicate, the silicon-mica composition is obtained with ease at a temperature of 180° C. Spectral analysis discloses no hydrocarbons in the finished product.

The silicon-mica composition may contain an inorganic filler which is preferably heat stable so as to be able to withstand the temperature to which the silicon-mica composition is to be subjected. The filler can be one or more of any of the inorganic materials selected from inorganic silicates, inorganic oxides, inorganic nitrides and inorganic halides, etc. Nonlimiting examples of silicates that can be employed as fillers in the composition of this invention includes aluminum silicate, magnesium silicate, strontium silicate, zinc silicate, manganese silicate. Nonlimiting examples of oxides that may be used are titanium dioxide, chromic oxide, lead mono oxide, manganese oxide, magnesium oxide, copper oxide, cobalt oxide, oxides of iron and barium oxide.

Examples of clays that may be used as fillers are bentonite clay, fuller's earth and feldspar. Still other materials that can be employed as fillers include such compounds as silicon carbide, various high temperature stable inorganic halides such as cadmium fluoride, aluminum fluoride, barium chlorides, etc.

In general the compositions of this invention are obtained by preparing a mixture of silicon compounds described above and mica, as well as filler material if the latter is used, and heating at sufficiently elevated temperature to cause the silicon compound to react with the mica and to drive off any residue liberated from the silicon compound as a result of the reaction. The residue may be removed from the silicon-mica composition with the aid of a partial vacuum. One method of preparing the silicon-mica composition is to treat the mica with hydrocarbon containing silicate compounds. The hydrocarbon silicate compound when in the liquid form may be applied in a variety of ways such as spraying or dipping of the mica in the hydrocarbon silicate with a subsequent removal of excess hydrocarbon silicate by any suitable means such as draining, pressing, centrifugation, etc. Alternatively, the mica particles may be thoroughly wetted with a hydrocarbon silicate by mixing the two together and subjecting the mixture to agitation if necessary and subsequently removing the excess hydrocarbon silicate. The mica particles may be in the form of flakes, powder, shredded mica fibers, mica which has been treated to form a pulp, etc. The wetted mica may be laid out or processed into a desired form by placing in a mold or spreading it out into a layer of a desired thickness so as to form a sheet upon further processing. The hydrocarbon silicate-mica mixture is then subjected to elevated temperatures until the hydrocarbon silicate has reacted with the mica to form the silicon-mica composition with the liberation of the hydrocarbon-containing residue which is removed from the product. One method, for example, when using mica in the form of particles ranging from 10 microns to about 1 centimeter in diameter is to emulsify the mica in water, pour the emulsion into a mold, and remove the water by evaporation, pressing, or centrifugation, followed by heating at atmospheric or reduced pressure to remove all traces of water. The hydrocarbon silicate compound or mixture of hydrocarbon silicate and filler can then be applied by a spray technique to one side of the thin layer of mica. Next, the hydrocarbon silicate wetted mica can be subjected to an elevated temperature until a reaction has taken place. The application of the hydrocarbon silicate can then be applied to the other surface of the thin layer of mica and the heating process repeated. The cycle of applying the hydrocarbon silicate to the mica and subsequent heating may be repeated a number of times until the desired silicon-mica product has been obtained. Alternatively, the silicate compound may be applied to both faces of the mica sheet in an amount sufficient for penetration into all spaces between the mica particles prior to heat treating. When solid silicon compounds are used with the mica, the components are mixed in the dry state and the mixture subjected to a sufficiently elevated temperature to bring about reaction between the mica and the silicon compound. The following examples more clearly illustrate the methods of the preparation of the compositions of this invention.

*Example I*

Synthetic mica fragments having a particle size of from about 10 microns to about 1 centimeter in diameter and a thickness of about 10–50 microns were emulsified in water to form a composition having the consistency of emulsified wood pulp paper. This was then formed in a thin layer on a platen press with sufficient material to provide a sheet of mica when pressed of 0.001 inch in thickness. The press was closed and heated to substantially 102° C. for a period of substantially 30 minutes to remove all traces of moisture. The press was then opened and tetra ethyl ortho silicate was applied to one surface of the pressed mica layer by a spray technique in an amount sufficient to wet the surface of the mica and soak into the pressed mica. The tetra ethyl ortho silicate-containing mica was then heated to a temperature of substantially 180° C. for a period of substantially 5 minutes. The partially treated mica sheet was then turned over and the process of applying the tetra ethyl ortho silicate was repeated on the reversed side of the mica sheet. The treated mica was again heated for a period of 5 minutes at a temperature of substantially 180° C. The product was then subjected to a temperature of substantially 340° C. for 15 minutes in order to remove all volatile hydrocarbon-containing residue liberated in the reaction of the tetra ethyl ortho silicate with the mica. This heating or post treating at elevated temperature is for the purpose of providing a mica sheet which can be used at high temperatures where evolution of gases from this sheet could not be tolerated.

The mica sheet of Example I had a thickness of 0.001 inch. It had a dielectric strength of 1200 volts per 0.001 inch thickness. The dielectric constant was 4.27 and the power factor was 0.14. It had a volume resistivity of $1.6 \times 10^{10}$ ohm cm. and a surface resistivity of $4.5 \times 10^{8}$ ohm. The mica paper of Example I had a tear strength of 2 oz. per .001 inch thickness, a tensile strength of 2600 lbs./sq. in. and a bend radius of ¼ inch without breaking.

The procedure of Example I was repeated with a modification that the mica sheet was made 0.040 inch thick. This silicon-mica sheet had the same electrical properties of Example I, and had a tear strength of 5 lbs. and a tensile strength of 2600 lbs./sq. in.

Other hydrocarbon silicate compounds used following the procedure of Example I were: tetra furfuryl ortho silicate to make a silicon mica sheet 0.002 inch thick; tetra phenyl ortho silicate to make a sheet 0.005 inch thick; tetra resorcinyl ortho silicate to make silicate-mica sheet 0.001 inch thick. All these various sheets had the same electrical properties as that prepared by the use of tetra ethyl ortho silicate. The sheet having a thickness of 0.002 inch had a tear strength of 4 oz., a tensile strength of 2600 lbs./sq. in. and a bend radius of ⅜ inch. The sheet having a thickness of 0.005 inch had a tear strength of 10 oz., a tensile strength of 2600 lbs./sq. in. and a bend radius of 0.5 inch.

*Example II*

A sheet of mica 3 inches square and 0.001 inch thick weighing 0.4664 gram was saturated with tetraethyl ortho silicate by applying the latter to both surfaces of sheet in an amount sufficient to penetrate into all spaces in between the mica particles within the sheet. The excess tetraethyl ortho silicate was removed with the aid of an absorbent material. The weight of the mica plus tetraethyl ortho silicate was 0.7512 gram. After heating at 180° C. as in Example I the weight was 0.5312 gram. The mica sheet was subjected to successive temperatures of 250° C., 370° C. and 540° C. The weight at the end of this treatment was 0.5154 gram. The difference between the initial and final weight of the mica sheet was 0.0490 gram representing an increase of 10.5 percent, based on the mica, and 17.2 percent based on the tetraethyl ortho silicate added. These weight figures would indicate that silicon was substantially the only residue of the tetraethyl ortho silicate left in the mica sheet after reaction. Spectral analysis disclosed no hydrocarbon residue in the silicon-mica composition. This mica sheet had the same physical and electrical properties as that described in Example I.

A silicon-mica sheet was prepared as in Example I containing 0.1 percent increase in weight. This increased the tear resistant strength of the mica sheet. In like manner a silicon-mica sheet was prepared containing sufficient silicon from the silicon compound which was added to the mica to increase the overall weight by 100 weight percent.

Example III

The process of Example I was repeated with the modification that the mica was wetter or impregnated with a 50/50 mixture of tetra ethyl ortho silicate and aluminum silicate. The aluminum silicate had a particle size which would pass through a 100–1000 mesh screen. The finished aluminum silicate impregnated silicon-mica sheet containing 20 weight percent aluminum silicate and silicon and 80 weight percent mica was .0015 inch in thickness. It had a dielectric strength of 1200 volts per mil, a dielectric constant of 4.5, a power factor of 0.16 and a resistance of $9 \times 10^8$ ohm. The sheet had a tear strength of 2 oz., a tensile strength of 2300 lbs./sq. in. and a bend radius of ¼ inch.

In a manner similar to that of Example III, silicon-mica compositions were prepared containing 7 weight percent magnesium silicate based on the mica. Likewise, a silicon-mica composition was prepared containing 5 weight percent of a mixture of black mica and kaolin which mixture contained 32 weight percent silicon, 5 weight percent iron and 11 weight percent aluminum.

Example IV

A silicon-mica sheet 1 inch in thickness is prepared by mixing mica pulp with didodecyl meta silicate and 0.1 percent by weight, based on the silicate, of bentonite clay, forming the mixture into a mat of the desired thickness and subjecting it to a temperature of 180° C. for 1 hour followed by 2 hours at 540° C.

In like manner, a mica insulation board is prepared by impregnating shredded mica fibers with a mixture of tetra(diethylamino)silane and 100 weight percent based on the mica of fuller's earth.

Example V

The procedure of Example I was followed using a mixture of natural mica flakes having a particle size of from 10 microns to about 1 centimeter in diameter with tetrachloro silane containing 2 weight percent titanium dioxide based on the mica.

Other silicon mica compositions are prepared using mixtures, in which the weights are based on mica, of mica, 60 percent tetra diphenyl diethoxy silane and 25 percent chromic oxide; mica, 200 weight percent dimethyl di(dibutylamino)silane and 60 percent by weight of lead oxide; mica, 100 weight percent dicyclohexyloxy dibromo silane and 75 percent by weight of kaolin; mica, 167 weight percent silicon nitride, $Si_3N_4$, and 25 percent by weight of siliconcarbide; mica, 50 weight percent ditolyl meta silicate, and 25 percent by weight of cadmium fluoride.

In the above examples, various amounts of filler were used. The amounts are not critical since it is seen that silicon-mica compositions may be prepared without the use of any filler. However, the filler serves to fill voids in the mica mat or sheet with greater ease than when using the hydrocarbon-containing silicates alone. Hence, the percentage of filler, based on the weight of the mica, can be as high as about 100 weight percent, the requirement being that enough filler be used to fill the voids between the particles of mica without leaving too much excess filler on the surface.

The reaction between the hydrocarbon silicates and mica may be carried out at temperatures as low as 50° C. However, in order to insure that all volatile components have been removed from the product, it is advisable to either heat to a higher temperature such as temperatures in the range of 150 to about 350° C. or to remove the volatile components by pumping under vacuum with or without the aid of heat. When the volatile components are removed by subsequent heating, it is advisable not to raise the temperature to the decomposition point of the mica. Mica decomposes at 1650° C. with the evolution of gas. Therefore, the post treatment should preferably be restricted to temperatures below this value. For example, subjecting the silicon-mica composition to a temperature of substantially 800° C. drives off all the volatile hydrocarbon compounds but does not decompose the silicon-mica product. The silicon-mica treated at such elevated temperatures is found to be a little less pliable than when treated at lower temperatures. This indicates that at elevated temperatures, further rearrangement in the bonding between the mica and the silicon takes place, possibly creating a greater number of silicon bridge-bonds between the mica particles and, thus, producing a composition which is less pliable.

The compositions of this invention are useful as electrical insulation material. For example, the silicon-mica composition can be used for interlayer electrical insulation in transformers and condensers, and as slot insulation in electrical motors. The mica-silicon compositions can also be used where a high temperature resistant insulation is required such as for wrapping of high temperature electrical wire. One example of the latter is in the insulation of terminal copper bar conductors. Another use is in the manufacture of radar transmission windows. The following example illustrates one of the instances in which the silicon-mica composition is employed.

Example VI

A coil bobin was wrapped with the composition of Example I so as to make a layer of insulation 4 sheets thick. On this insulation was wound 4 layers of electrically conducting, gage #26, anodized aluminum wire in closely spaced turns. This was followed by another 4 layers of the silicon-mica insulating sheet and more aluminum wire. The finished transformer contained 4 layers of anodized aluminum wire interspaced with layers of silicon-mica insulation each containing 4 sheets of 0.001 inch in thickness. The anodized aluminum wire is rated to carry 0.4 amp. of current for each 85° C. rise in temperature. To test the silicon-mica composition, the current was increased to 4 amps. and the voltage gradually increased to 280 volts until the temperature reached substantially 370° C. The transformer was then put in an oven maintained at a temperature of 260° C. and the voltage increased to 240 volts, raising the temperature within the unit to substantially 650° C. No electrical breakdown occurred between the wire and the core of the transformer indicating that the silicon-mica insulating sheet did not break down.

To further test the high temperature resistance of the silicon-mica composition of this invention, a sheet 0.001 inch thick, prepared as in Example I, was held in a Bunsen burner flame and held at a temperature of substantially 1100° C. without being visibly affected.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A composition of matter consisting essentially of silicon-bonded mica particles.

2. A composition of matter consisting essentially of silicon-bonded mica wherein the mica consists essentially of particles having a diameter of substantially 10 microns to 1 centimeter.

3. A composition of matter consisting essentially of mica particles bonded together with from 0.1 to about 100 weight percent silicon based on the weight of the mica.

4. The composition of claim 3 wherein the amount of silicon is from 1 to about 25 weight percent.

5. A composition of matter consisting essentially of mica containing in admixture therewith from 0.1 to about 100 weight percent, based on the mica, of a heat stable compatible filler material, bonded together with from 0.1 to about 100 weight percent silicon based on the weight of the mica.

6. The composition of claim 5 wherein the compatible filler is selected from the group consisting of inorganic silicates, inorganic oxides, inorganic nitrides, inorganic halides and inorganic sulphates.

7. A process for the manufacture of a silicon-mica composition comprising heating mica particles with at least one silicon-containing compound having at least two —Y groups bonded to silicon in each molecule of said compound wherein Y is selected from the group consisting of —X, —NR$_1$R$_2$, —OR$_3$ $$-O-\overset{O}{\underset{\|}{C}}-R_4$$

wherein X is a halogen atom, R$_1$ and R$_2$ are selected from the class consisting of hydrogen and hydrocarbon groups having from 1 to about 18 carbon atoms, R$_3$ and R$_4$ are hydrocarbon groups having from 1 to about 18 carbon atoms; said heating being carried out at a temperature sufficient to bring about bonding of said mica particles.

8. The process for the manufacture of a silicon-mica composition comprising heating mica particles containing in admixture therewith from 0.1 to about 100 weight percent, based on the mica, of a compatible filler material, with at least one silicon-containing compound having at least two —Y groups bonded to silicon in each molecule of said compound wherein Y is selected from the group consisting of —X, —NR$_1$R$_2$, —OR$_3$, $$-O-\overset{O}{\underset{\|}{C}}-R_4$$

wherein X is a halgon atom, R$_1$ and R$_2$ are selected from the class consisting of hydrogen and hydrocarbon groups having from 1 to about 18 carbon atoms, R$_3$ and R$_4$ are hydrocarbon groups having from 1 to about 18 carbon atoms; said heating being carried out at a temperature sufficient to bring about bonding of said mica particles.

9. The process of claim 7 wherein the silicon-containing compound is an organic silicate.

10. The process of claim 7 wherein the silicon-containing compound is an organic ortho silicate.

11. The process of claim 7 wherein the silicon-containing compound is tetraethyl ortho silicate.

12. A composition of matter obtained by heating a mixture of mica particles and at least one silicon-containing compound having at least two —Y groups bonded to silicon in each molecule of said compound wherein Y is selected from the class consisting of —X, —NR$_1$R$_2$, —OR$_3$, $$-O-\overset{O}{\underset{\|}{C}}-R_4$$

wherein X is a halogen atom, R$_1$ and R$_2$ are selected from the class consisting of hydrogen and hydrocarbon groups having from 1 to about 18 carbon atoms, R$_3$ and R$_4$ are hydrocarbon groups having from 1 to about 18 carbon atoms; said heating being carried out at a temperature sufficient to bring about bonding of said mica particles.

13. The composition of claim 12 obtained by heating said mica and said silicon-containing compound at a temperature of from about 60 to about 1500° C.

14. The composition of claim 12 obtained by heating said mica and said silicon-containing compound at a temperature of from about 150 to about 800° C.

15. A composition of matter obtained by heating a mixture of mica particles and at least one silicon-containing compound having at least two —Y groups bonded to silicon in each molecule of said compound wherein Y is selected from the group consisting of —X, —NR$_1$R$_2$, —OR$_3$, $$-O-\overset{O}{\underset{\|}{C}}-R_4$$

wherein X is a halogen atom, R$_1$ and R$_2$ are selected from from the class consisting of hydrogen and hydrocarbon groups having from 1 to about 18 carbon atoms, R$_3$ and R$_4$ are hydrocarbon groups having from 1 to about 18 carbon atoms; wherein the amount of said silicon-containing compound is equivalent to from 0.1 to about 100 weight percent silicon based on the weight of said mica; said heating being carried out at a temperature of from about 60 to about 1500° C.

16. A composition of matter obtained by heating a mixture of mica particles and tetraethyl ortho silicate wherein the amount of said silicate is equivalent to from 0.1 to about 100 weight percent silicon based on the weight of said mica; said heating being carried out at a at a temperature sufficient to bring about bonding of said mica particles.

17. The composition of claim 16 obtained by heating said mica with said tetraethyl ortho silicate at a temperature of substantially 180° C.

18. The composition of claim 15, wherein said mica particles have a diameter of substantially from about 10 microns to about 1 centimeter.

19. A composition of matter obtained by heating a mixture of mica particles having a diameter of substantially from about 10 microns to about 1 centimeter, from 0.1 to about 100 weight percent based on the mica of a compatible filler material, and at least one silicon-containing compound having at least two —Y groups bonded to silicon in each molecule of said compound wherein each Y is selected from the group consisting of —X, —NR$_1$R$_2$, —OR$_3$, $$-O-\overset{O}{\underset{\|}{C}}-R_4$$

wherein X is a halgen atom, R$_1$ and R$_2$ are selected from the class consisting of hydrogen and hydrocarbon groups having from 1 to about 18 carbon atoms; wherein the amount of said silicon-containing compound is equivalent to from 0.1 to about 100 weight percent silicon based on the weight of said mica; said heating being carried out at a temperature sufficient to bring about bonding of said mica particles and said filler material.

20. The composition of claim 19 obtained by heating said mica, said filler material, and said silicon-containing compound at a temperature of from about 150° C. to about 800° C.

References Cited in the file of this patent

UNITED STATES PATENTS

| 2,174,770 | Wilson | Oct. 3, 1939 |
| 2,388,161 | Kropa | Oct. 30, 1945 |
| 2,432,891 | Hervey | Dec. 16, 1947 |
| 2,443,663 | Rider et al. | June 22, 1948 |
| 2,456,251 | Boughton et al. | Dec. 14, 1948 |
| 2,590,493 | Berberich et al. | Mar. 25, 1952 |
| 2,595,730 | Swiss et al. | May 6, 1952 |
| 2,641,044 | Bearer | June 9, 1953 |
| 2,718,483 | Clark | Sept. 20, 1955 |
| 2,739,638 | Lewis et al. | Mar. 27, 1956 |

FOREIGN PATENTS

| 125,700 | Australia | Sept. 30, 1947 |